United States Patent [19]
Lengyel et al.

[11] Patent Number: 5,600,432
[45] Date of Patent: *Feb. 4, 1997

[54] METHOD AND APPARATUS FOR MEASUREMENT OF RESOLUTION OF IMAGING SYSTEMS

[75] Inventors: J. Michael Lengyel, Ramona, Calif.; Randy M. Maner, Albuquerque, N.M.; Larry A. Nelson, Bellevue, Wash.

[73] Assignee: Honeywell Inc., Minneapolis, Minn.

[*] Notice: The term of this patent shall not extend beyond the expiration date of Pat. No. 5,526,113.

[21] Appl. No.: 263,897

[22] Filed: Jun. 21, 1994

[51] Int. Cl.$^6$ .................................................. G01N 21/00
[52] U.S. Cl. ........................................ 356/124.5; 356/239
[58] Field of Search .................................. 356/121, 124, 356/124.5, 345, 355, 71, 239, 237

[56] References Cited

U.S. PATENT DOCUMENTS

| | | | |
|---|---|---|---|
| 3,657,550 | 4/1972 | Brown et al. | 250/217 CR |
| 3,733,135 | 5/1973 | Diakides et al. | 356/124.5 |
| 3,938,892 | 2/1976 | Koingman, III | 356/124.5 |
| 4,408,163 | 10/1983 | Burr et al. | 324/404 |
| 4,602,272 | 7/1986 | Duschl | 358/10 |
| 4,797,619 | 1/1989 | Austin et al. | 324/409 |
| 5,072,314 | 12/1991 | Chang | 359/559 |
| 5,075,883 | 12/1991 | Friedman et al. | 356/124.5 |
| 5,105,380 | 4/1992 | Owechko | 364/825 |
| 5,109,533 | 4/1992 | Mine et al. | 455/63 |
| 5,111,110 | 5/1992 | Houben | 315/10 |

OTHER PUBLICATIONS

"Spatial Filtering and Optical Information Processing," Ch. 7 of *Introduction to Fourier Optics* by J. W. Goodman, McGraw–Hill Publishing Co., pp. 141–149 (1988).
"Measures of Image Quality" by L. A. Nelson et al., SID 91 Digest, pp. 768–771 (1991).
*Digital Picture Processing* by A. Rosenfeld et al., Second Edition, vol. 1, Academic Press, San Diego, pp. 75–78 (1982).
*The Fourier Transform and Its Applications* by R. N. Bracewell, McGraw–Hill Book Co., New York (1965) (no copy provided; suggested by inventor as background reference).

*Primary Examiner*—Hoa Q. Pham
*Attorney, Agent, or Firm*—Kenneth J. Johnson

[57] ABSTRACT

A photographic facsimile of a line image at a predetermined orientation is illuminated by a collimated monochromatic light source to produce a diffraction pattern. The diffraction pattern is focussed by a converging lens to image the Fourier transform of the line image on a spatial frequency plane. The image in the spatial frequency plane is applied to a detector for measuring the spatial power distribution as a function of the spatial frequency. The line image is then reoriented in the image plane, and successive measurements made as the image is rotated in the image plane. Resolution is quantified in the spatial frequency plane as the magnitude of a selected signal as a function of displacement (i.e, spatial frequency). By simulating selected imaging components and generating a resultant line image, the resolution of any imaging system component may be measured.

5 Claims, 6 Drawing Sheets

METHOD AND APPARATUS FOR MEASUREMENT OF RESOLUTION OF IMAGING SYSTEMS

BACKGROUND OF THE INVENTION

1. Field of the Invention

The present invention generally relates to optical measurements and, more specifically, to a method of and apparatus for determining the resolution performance of imaging system components by measuring spatial frequency parameters. A measure of resolution of an imaging system provides an objective measure of the image quality of the imaging system.

2. Description of the Prior Art

The present invention is concerned with defining and measuring parameters representative of image resolution and is particularly adapted to matrix color and monochrome displays. While components in imaging systems are judged by the quality of a delivered image, no method or apparatus exists which accurately measures the properties associated with a high quality image.

Since directional resolution singularities and Moire' patterning within image structures are common, a method for characterizing actual imaging limitations of image system components is needed. Preferably, the metrics developed to characterize imaging properties would be measurable using appropriate laboratory apparatus. This invention introduces apparatus and methods that utilize a set of primitive image inputs whose outputs provide resolution measures of an imaging system or component.

This is accomplished through appropriate choice of image primitive and measurement in the spatial frequency domain.

The present invention creates a representation of spatial frequency power spectra from static spatial images. The spatial image to power spectral density conversion is accomplished via an optical, two-dimensional Fourier transform of the input image.

The present invention is particularly applied to the measurement of resolution for active matrix flat panel displays, and can readily be adapted to any component of an imaging system, such as the symbol generator, transmission system, or sensor.

Every imaging system component displays, processes, transmits, stores or generates images. The term "image", as we are using it here, is defined to be a continuous two-dimensional visual representation of something. As a consequence of the sampling process to be described, for all imaging system components other than the display panel the data which represents the image is not actually continuous two-dimensional visual information. Instead, the image is represented in translatable form which defines the continuous two-dimensional visual information. The visual form of the information is always a spatial distribution of light over a particular size plane.

For many display systems it is difficult for the system designer to identify the specific component or subassembly in the display system, e.g., the display head, symbol generator, transmission system, and sensors, that impairs the intended image, and to what degree the intended image was degraded or improved by implementing a design change. Heretofore the subject of image quality was based upon subjective measures, as visually observed by the operator.

Image quality has historically been a subjective entity measurable only through psychophysical experimentation and statistical analysis of many observers' opinions (c.f. L. A. Nelson, R. M. Maner, M. J. Lengyel, M. Seo, *Measures of Image Quality*, Society for Information Display International Symposium Digest of Technical Papers, pp 768–771, 1991). The psychophysical measures are extremely complex because chromatic, temporal, and luminance errors all contribute to perception of image quality. As these contributions are not readily measured in practice, comparisons between overall image quality determinations has heretofore not been feasible. For the foregoing reasons, a need remains in the art for an apparatus and method of objectively determining the resolution of display devices and imaging systems that is essentially independent of subjective influences.

Resolution has conventionally been defined in terms of the ability to distinguish information in the output image when a particular input target (such as the pairs of bars on a resolution chart) is used to stimulate the imaging system. The closer the spacing of pairs of bars which can be distinguished, the greater the relative resolution.

For a color Cathode Ray Tube (CRT), resolution is most often described in terms of the number of distinct dots which can be visibly displayed in a given screen area. A typical display can provide a resolution of about 100 dots per inch, indicating that dots $\frac{1}{100}$ inch in separation can be visibly distinguished.

The methods and systems used in measuring resolution for CRT-type displays are not adequate for measuring the resolution of active color matrix displays or for any other imaging system component. The present invention utilizes the measured Fourier transform of the impulse response of the imaging system component to determine its resolving capability. This invention provides the apparatus and methodology to predict resolution accurately, via use of an image simulator, for any imaging system component before construction and to measure resolution after the component has been constructed.

The methods used in the prior art to measure resolution of CRT displays are widely varied and well documented; however, one common aspect is that the measurement is made in the spatial domain with a photometer directly from the light energy presented on the face of the display. Generally, the data is measured for only one or two (horizontal and vertical) spatial orientations, which is an incomplete characterization of the display system.

One known method requires that an electrical impulse be applied to the cathode and a light measuring instrument records the illumination footprint on the display surface. After the transient data is acquired, it is necessary to compute a Fourier transform to express the system response in the frequency domain.

Another common technique for determining the impulse response of the CRT display is to write lines at different orientations on the display and measure their cross-sectional profile with a slit scan photometer. The cross section of the line is the system's impulse response in one spatial orientation. A complete two-dimensional measure of resolution is obtained by compiling a family of transient responses. One transient response (i.e., cross-sectional profile of the line) is measured for each orientation of the line on the display surface in the spatial domain.

Another prior art method for color shadow mask CRT displays is to focus a light measuring instrument through one hole of the shadow mask. The deflection circuitry is then stimulated to scan the electron beam across the hole location on the shadow mask. The recorded illumination footprint is the impulse response (i.e., profile of the scan line) of the CRT display. Since a display system of this type generally exhibits or is assumed to be circularly symmetric, due to the nature of the electron beam, it is necessary to make the measurement in only one spatial orientation.

In E. F. Brown, et al, U.S. Pat. No. 3,657,550, there is disclosed an apparatus for measuring the spatial response of optical systems (e.g., a television system). A display is generated in a cathode ray tube by means for varying the periodicity of a predetermined spatial waveform image. The optical system under test is disposed between the cathode ray tube and a masked aperture, with a photo-detector disposed behind the mask so as to provide an output proportional to the light intensity as the spatial waveform is slowly scanned with respect to the aperture. Brown et al does not teach the use of an optical Fourier transform to resolve the spatial image into spatial frequency components of varying amplitude as in the present invention, nor does he teach a method of measurement that produces accurate results in the presence of spatial quantization of an image.

Figure 1:
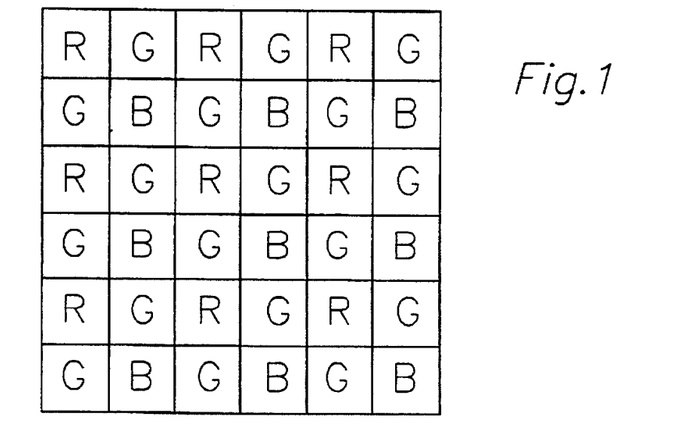
FIG. 1 is a representation of an active color matrix display panel comprised of rectangular pixels.

Prior art methods using spatial domain measurements are severely limited when applied to active matrix flat panel displays. FIG. 1 shows such a panel which is comprised of rectangular shaped picture elements, where R, G, and B respectively denote red, green, and blue color picture elements Such displays do not have a circularly symmetric response to a narrow line image (herein referred to as "impulse" response), nor do they have deflection circuitry. For these reasons, it is necessary to measure a family of cross-sectional profiles of line images at many orientations on the display surface to obtain a measurement of the component's resolution. This infers use of the cross-sectional slit scanned photometric method described above for CRT displays.

Erroneous measurements can occur using the slit scan methodology as a direct result of the spatial quantization (i.e, feature size of each light emitting element) of the display surface associated with color matrix displays. The physical size of the spatial quantization on the display surface dictates the length and width requirements for the slit aperture of the slit scanned photometer.

Figure 2:
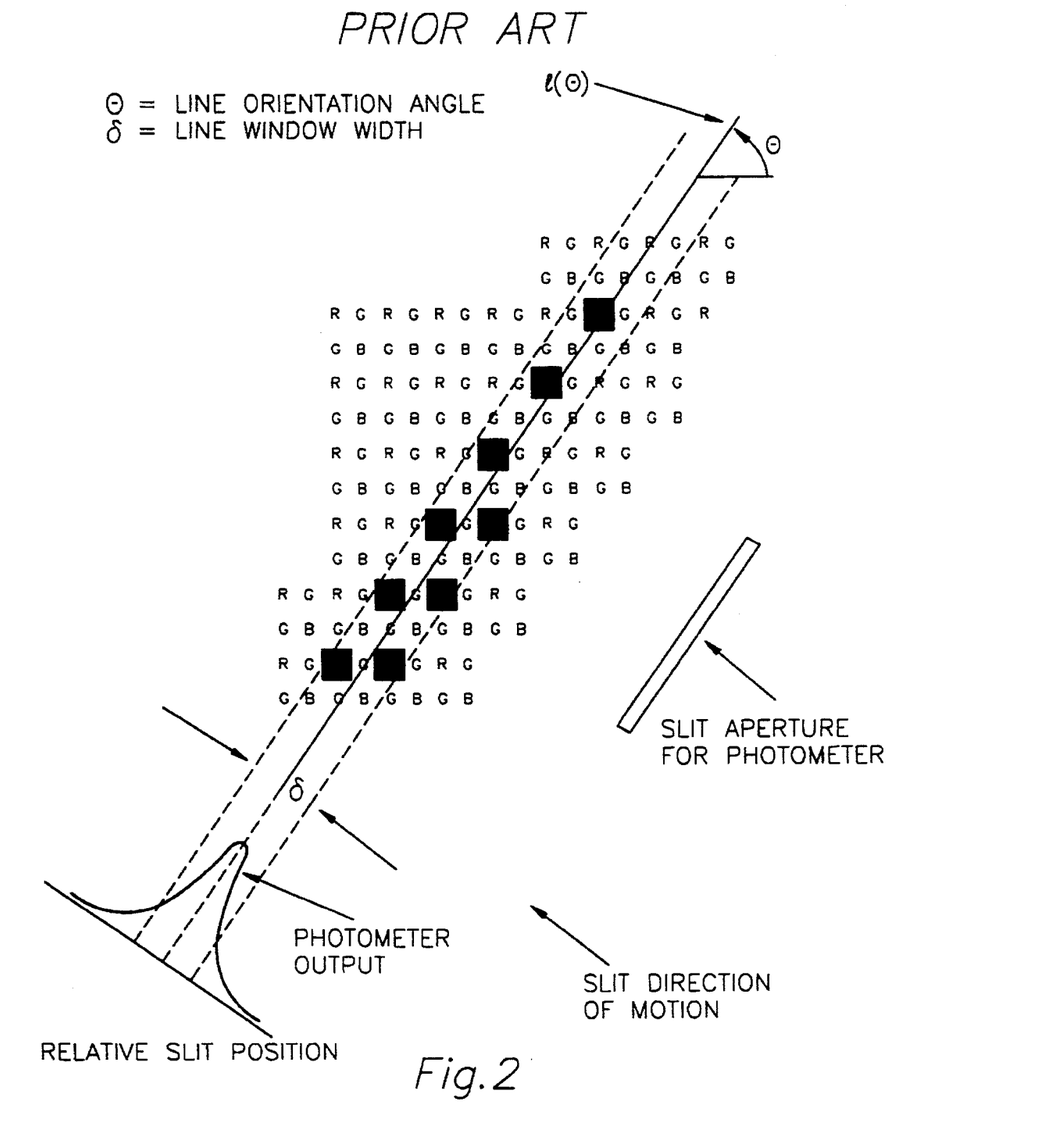
FIG. 2 is an illustration of a slit scan photometer process of the prior art.

Thus, for certain geometric displays, such as an inclined line, there may result a "staircase" effect due to the finite spacing and orientation of the illuminated elements. For any orientation of the line image on a sampled display surface, the slit must be physically long enough to cover a sufficient number of display elements of the staircase such that an accurate measure of the width of the sampled line is possible. A sufficient number of such elements is captured when the staircase pattern has repeated itself either many times or exactly one time within the length of the slit aperture. FIG. 2 illustrates this limitation associated with the finite length of the slit aperture. The width of the slit aperture is the dominating factor for the spatial bandwidth of the photometric slit scan measurement system. Consequently, while maintaining the required length of the slit aperture, it is also necessary to ensure the width of the slit aperture is approximately one-tenth the pixel aperture size on the matrix display surface being measured.

The limitations associated with the slit scan method do not prohibit the use of this method for measuring the resolution of a sampled imaging system component. However, it could require a complete family of slit apertures for each measurement and possibly another family of slit apertures for displays with different pixel densities. The large number of slit apertures and measurements required for this method of measurement is extremely cumbersome and expensive to implement.

Further, the physical limitations (i.e., length-to-width ratio) associated with manufacturing the required variations of slit apertures are prohibitive, which makes this method of measurement impractical to implement in general for sampled display surfaces.

Alternative methods using a scanning slit aperture have been proposed. These methods are mechanically complex and slow in operation. They are, as a result, prone to error and involve complex manipulations of the measurement data sets after measurement. For the foregoing reasons the methods of the prior art cannot reasonably be extended beyond stroke written CRT displays.

It is known that an image may be characterized by an optical Fourier transformation of the image into a spatial light distribution pattern in which the light intensity varies in accordance with the amplitudes of the frequency components in the input signal, analogous to the Fourier transform of a complex electrical waveform into a plurality of sine waves. See, for example, J. W. Goodman, *Introduction to Fourier Optics*, McGraw-Hill, 1968, pp. 141–149. See also copending U.S. Pat. Ser. No. 08/263319. *Method and Apparatus for Measurement of Spatial Signal and Noise Power of Imaging Systems*, filed Jun. 24, 1994, and assigned to the assignee of the present invention.

The present invention overcomes the disadvantages of the prior art by making measurements in the spatial frequency domain, not in the spatial domain. The invention is applicable to any imaging system component, and is not limited to the display device. The present invention enables a generic measurement method of resolution for any component of an imaging system. This invention is capable of generating and measuring the two dimensional spatial frequency power spectrum of its input image. When the input image is the result of an applied impulse to the imaging system component, the spatial frequency power spectrum contains the necessary information to measure resolution of the imaging system component.

SUMMARY OF THE INVENTION

The invention provides a method and apparatus for measurement of resolution of an imaging system, and comprises providing a display of a line image at a predetermined angular orientation, providing a photographic facsimile of the line image, providing a light beam in the form of coherent light of a given wavelength, the beam defining an optical axis, and applying the light beam to the photographic facsimile along the optical axis, thereby to produce a diffraction pattern of the line image.

The invention further comprises focussing a converging thin lens upon the diffraction pattern so as to produce a spatial frequency distribution thereof focussed on a spatial frequency plane, the spatial frequency distribution comprised of spatial frequency components, focussing a magnifying lens upon the spatial frequency plane whereby to produce a magnified image of at least a portion of the spatial frequency components, applying the magnified image to a detector and recording a digitized image of the detected spatial frequency components, incrementally positioning the displayed line image to a further orientation and generating a corresponding photographic facsimile so as to provide a further diffraction pattern and recording the image of corresponding spatial frequency components in digital form, repeating the incremental positioning of the line image to encompass a 360° rotation in the spatial frequency plane, and measuring the spatial frequency components corresponding thereto, the amplitude and spatial distribution of the stored image being a measure of component resolution.

The advantages of the present invention will be apparent to those skilled in the art from the following description, taken with reference to the accompanying drawings, wherein like reference numerals refer to like element.

DESCRIPTION OF THE PREFERRED EMBODIMENT

To facilitate an understanding of the invention, it is helpful to examine how an image is digitally formed and displayed. Modern imaging systems are sampled data systems. In order to process an image for storage in a memory array, or for transmission to a receiver, it must be digitized. A continuous picture may be represented by a finite string or array of numbers, denoted "samples". Sampling imposes restrictions on the system input according to the sampling structure, sampling density, and reconstruction method. The sampling used in imaging systems is usually multi-dimensional. Samples are stored which represent color, luminance, and motion (e.g., time sampling) for a two-dimensional (or possibly 3D) color image.

The resolution of an imaging system component can be measured by means of the two-dimensional Fourier transform capability of the present invention when the appropriate input images are used. Analysis of the imaging device under test is facilitated by the use of a line image which is captured in photographic form. The line image is produced by the imaging system component being measured. A photographic facsimile of the line image is then used for the measurement. The line image effectively stimulates the imaging system device with an impulse orthogonal to the direction of the line, providing the maximum distribution of energy for that particular line orientation in the two-dimensional spatial frequency domain. This is analogous to the use of a unit impulse to excite an electrical filter network. Clearly, an adequate characterization of the full range of potential power spectrums presented on the face of the display cannot be achieved by measuring a single line in a single orientation. Thus, it is necessary to repeat the measurement of the line image on the display surface for every orientation, 0 through 180 degrees. In practice, it may be expedient to utilize larger rotational intervals, say 30° or less. Tabulating the results of the two-dimensional spatial frequency power spectra will provide information from which the resolution of the imaging system device may be determined, in a manner to be described.

The mathematics which describe the spatial frequency representation of a sampled line image are complex. (See, e.g., A. Rosenfeld and A. Kak, *Digital Picture Processing*, Academic Press, Vol. 1, 2d ed., pp. 72–106.) Although it is not necessary fully to understand such mathematics, it is helpful to understand two properties which are most easily explained thereby:

1. The Fourier transform of a sampling lattice or structure is another sampling lattice whose spacing and organization is dictated by the size and organization of the spatial domain sampling lattice.

2. The signal when applied to (i.e., drawn on) a sampling lattice in the spatial domain can be modeled mathematically as a multiplication of the signal function by the sampling lattice function. Consequently, in the spatial frequency domain this is a convolution of the Fourier transform of the signal with the transform of the sampling lattice. This convolution results in a replication of the Fourier transform of the signal at every position of the sampling lattice in the spatial frequency domain.

Adopting a universally acceptable convention to describe or define resolution for illuminated displays is a difficult task which has been further complicated with the onset of active matrix flat panel displays. The convention used herein is closely related to the linear system analysis concept of a Modulation Transfer Function (MTF). The classical method of measuring the MTF of a linear system is to stimulate the system with an impulse image. The Fourier transform of the output image is the MTF or frequency response of the system. Another classical method is to stimulate the system with a plurality of sine waves or bar patterns of increasing frequency, and measuring the modulation depth of the output signal. The modulation depth is then plotted at the spatial frequency of the input sine wave or bar pattern to generate the frequency response of the system.

When the output of the system depends upon the exact alignment of the input with respect to a given sampling structure (commonly referred to as the property of shift variance) the system is not linear. The assumption of linearity is included in the conventional assumptions made for MTF characterization of system performance. When dealing with systems which may be shift variant (nonlinear) the resulting function is not a MTF in the classical sense. Instead, in the present invention a spatially bandlimited input stimulus is applied to characterize the output for this particular input. This is defined herein as a "resolution function". Such a function may not describe the system in general, but is an accurate description for the particular input stimulus.

A practical known limiting condition (generally the most narrow line to be displayed) is selected as the input image. Such an input condition is herein defined as an "impulse" and the output result of this input is designated as the "impulse response" For example, lines may be written with a selected cross-sectional profile and width. To provide an output in standard form, the resolution function is expressed in the spatial frequency domain in a manner analogous to MTF descriptions.

The resolution of an imaging system component is thus defined herein as the input-to-output relationship of the system which expresses modulation depth (or relative attenuation) as a function of spatial frequency. Display system components present or process two-dimensional spatial information. Consequently, the resolution must be defined by a two-dimensional function in the spatial frequency domain where the dependent variable is the relative attenuation of the system associated with the two-dimensional spatial frequency.

Figure 3:
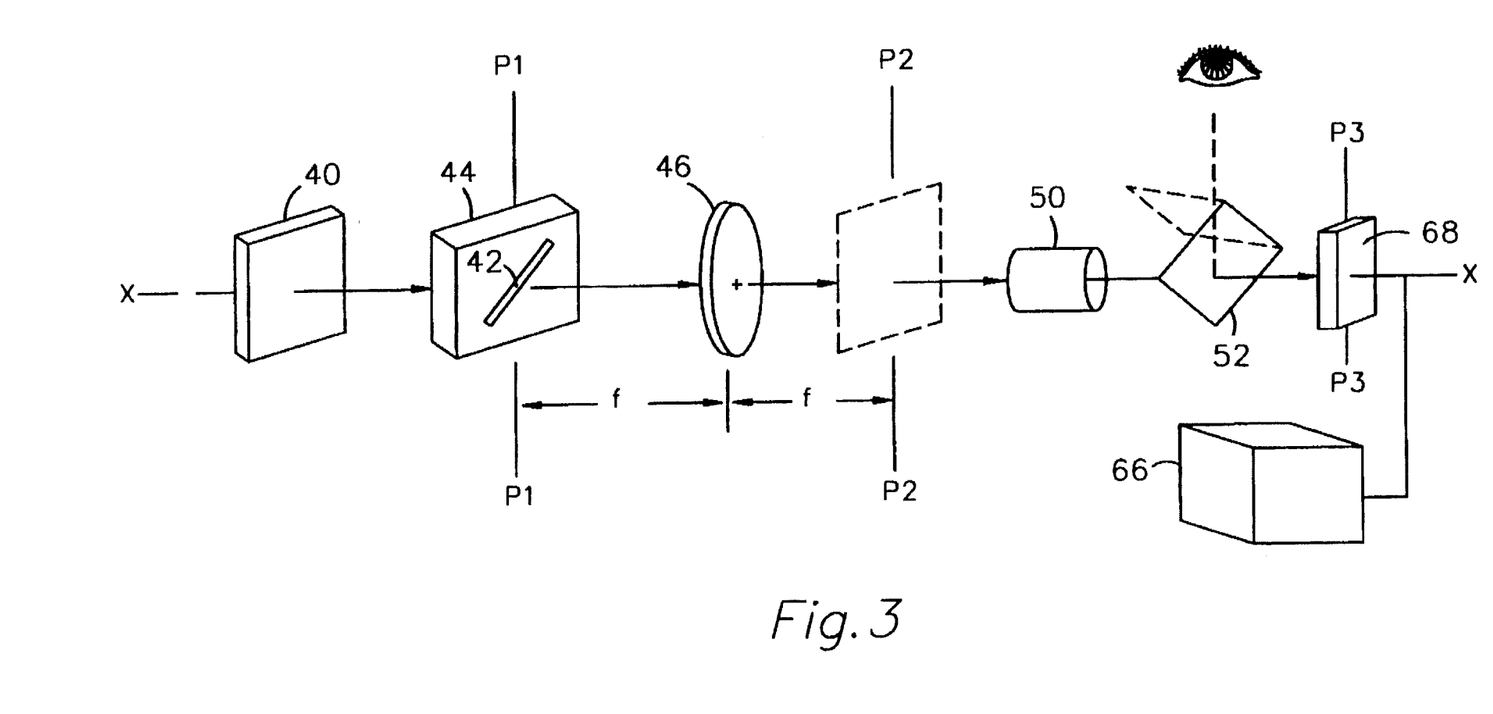
FIG. 3 is a functional block diagram illustrating the optical components comprising the apparatus for resolution measurements.

Referring now to FIG. 3, there is shown in schematic form a functional block diagram illustrating the optical components comprising the apparatus for resolution measurement. The function of the resolution measurement apparatus is to convert static image intensity variations across an image plane P1 into its corresponding spatial frequency power spectrum at the spatial frequency plane P2 such that a measure of resolution can be made in terms of spatial frequency and amplitude parameters.

To obtain a two-dimensional measure of resolution it is necessary to photograph a family of line images from a display head or from an image simulator. Each family member has an unique line orientation on the photographed surface. By photographing the line image in many orientations on the display surface it possible to assimilate a family of one-dimensional impulse responses. By piecing together the Fourier transform of the impulse responses, a composite two-dimensional characterization of the photographed imaging system component is formed.

The optical components are aligned along an optical axis x—x on the optical center line of the system, which is established by the center line of a planar coherent light source 40. All of the optical components are mounted on an optical table which is supported by pneumatic isolation mounts (not shown). The light source 40 is a helium neon laser projected through a collimating beam expander. The intensity of the expanded laser beam is approximately Gaussian.

The input image 42 is placed in a refractive index-matching oil-filled liquid gate 44 and is a high quality monochrome positive film photograph of the imaging system component being measured. This static spatial image must be an accurate representation of the visual information as it would be reconstructed and displayed with the component under test.

The liquid gate 44 is a reservoir filled with a high quality optical oil that has an index of refraction which closely matches the index of the film. The liquid gate is well known (c.f. J. F. Goodman, supra, pp. 154–155) and is constructed of a housing containing a pair of optical flats which constrains the oil for receiving the film.

The planar light wave emanating from laser light source 40 is directed to the image plane P1 defined by the liquid gate 44 and photograph of a line image 42. There it is obstructed by the spatial line image and produces a far field or Fraunhofer diffraction pattern of the input image at the image plane P1. The diffraction pattern is focussed by a converging thin lens 46 where the Fourier transform of the input image is brought to a focus at the spatial frequency plane P2. The so-called "thin lens" is not necessarily thin in physical size, but rather denotes a lens which offers negligible transverse offset of an incident light ray. For this purpose, a collinear transmissive dual achromatic lens is suitable.

The transformed image is enlarged by passage through the magnification optics 50 for measurement. Magnification optics 50, which may be a conventional macro lens, focuses the enlarged transform pattern directly onto the detector array of a video camera 68. Positioning of the magnified pattern on the measurement plane P3 is aided by use of the viewing optics 52 of the camera 68. As shown, the viewing optics 52 comprise a folding mirror which deflects a portion of the incident light rays to the observer, and which is moved out of the optical path during the measurement. By using a high quality photographic system with a wide range of magnification factors to capture the input image, it is possible to size the input image such that the resolution measurement system is never exceeded in its ability to render an accurate power spectrum of the input image. The camera output is captured in digital form using an image frame grabber system 66, which digitizes and stores the resultant image spectral data for analysis. Personal computer-based digital image processing and analysis systems are well known. One such system is commercially available from Werner Frei Associates of Santa Monica, Calif.

The stored image contains all the information to perform measurement of resolution for one spatial orientation, as a consequence of stimulating the imaging system component with an impulse in a direction orthogonal to the line image. As noted above, by using a line image with a further orientation on the display surface as the measurement system input and storing the resultant transformed pattern, another slice of the two-dimensional resolution function for the imaging system component can be constructed. Repeating this process for numerous line orientations and assembling the measured data yields a complete measurement of the two-dimensional resolution function.

The frame grabber 66 is used to isolate and store the spatial frequency power spectrum or a magnified portion of the power spectrum of the input line image. The computer which manages the captured spectral data also provides the required graphing and analysis tools for the system. The degree of accuracy of the resolution measurement is a function of the resolution and sensitivity of the video camera, the digitizing capabilities of the frame grabber, and the amplitude of the power term in the spectral density pattern incident on the output measurement plane. The optimum configuration for the measurement system is achieved when a single power term is distributed over the greatest surface area of the video camera.

The video camera can be a charge coupled device (CCD) with a high density detector array (typically, 754 horizontal elements by 488 vertical elements, or more, over an area of 8.8 by 6.6 mm.) or a small high quality vidicon based CCTV camera. The composite video output of the video camera is provided as the input into the image frame grabber 66, which digitizes the serially transmitted data from the video sensor and assembles the two-dimensional image into a data array. All or a magnified portion of the power spectral density pattern to be measured is focussed onto the sensing element. The output from the camera is digitized with at least an 8-bit gray level dynamic range per sample. The measured parameter is the relative intensity versus spatial frequency along one replica of the transform.

Figure 5:
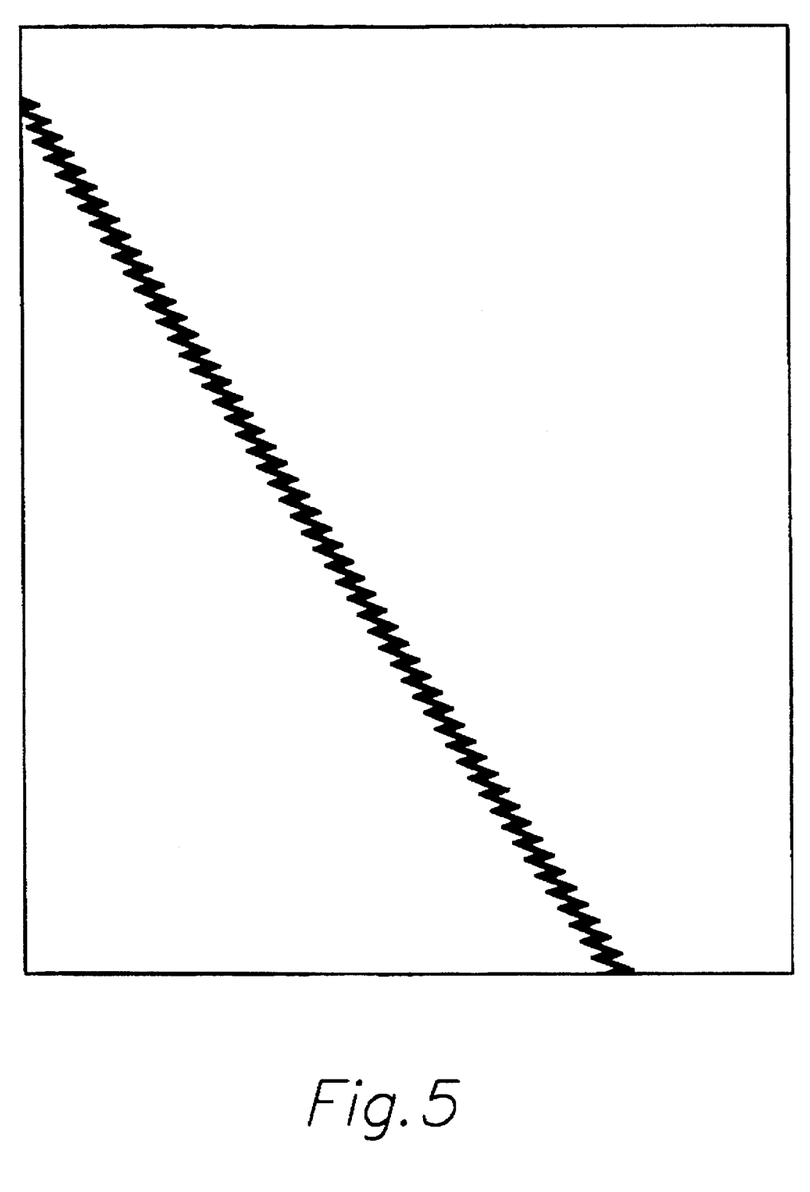
FIG. 5 shows an example of an input image of a selected color line on a triad color group matrix display.
Figure 6:
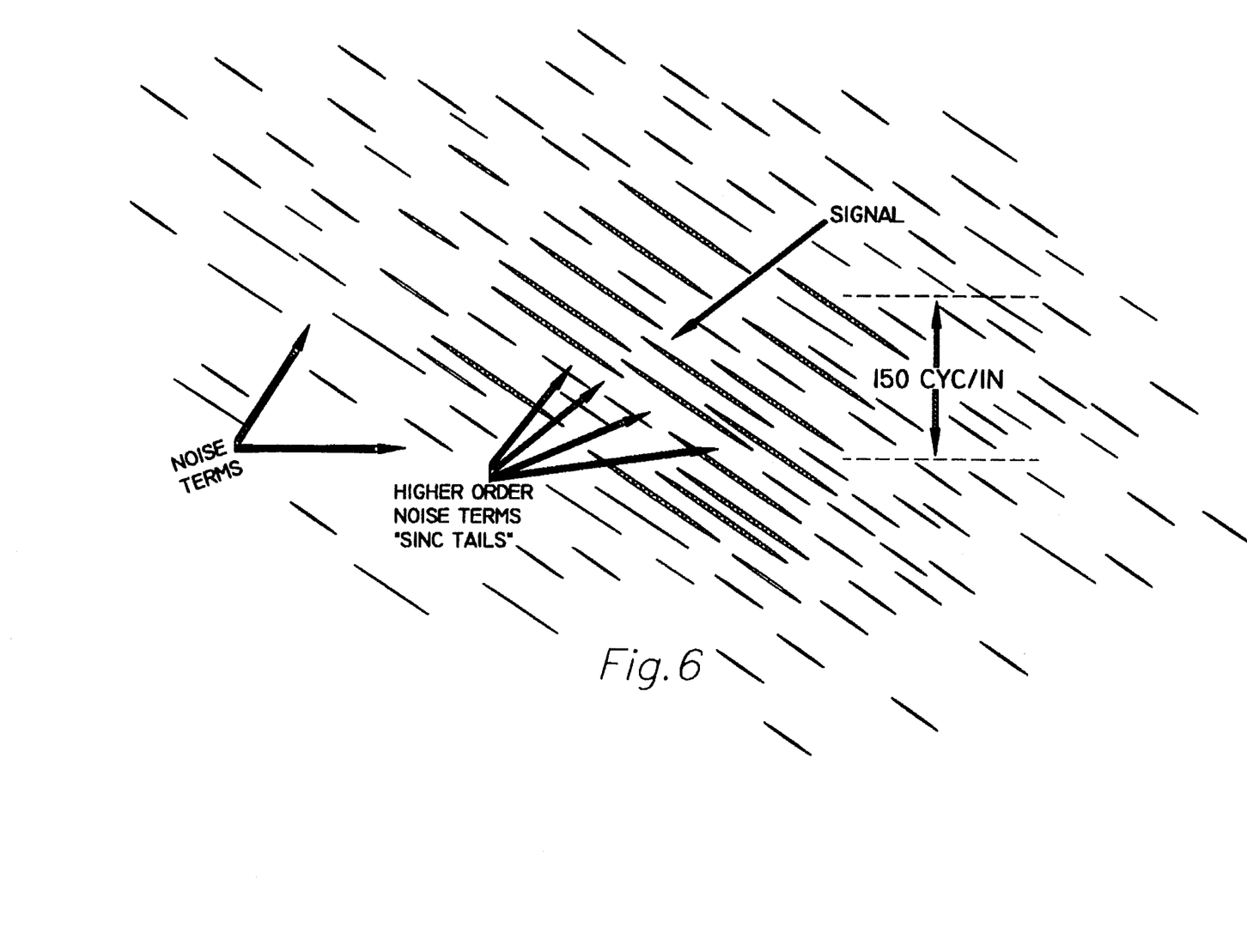
FIG. 6 is the power spectrum of the diffracted image of FIG. 5 in the spatial frequency plane.
Figure 7:
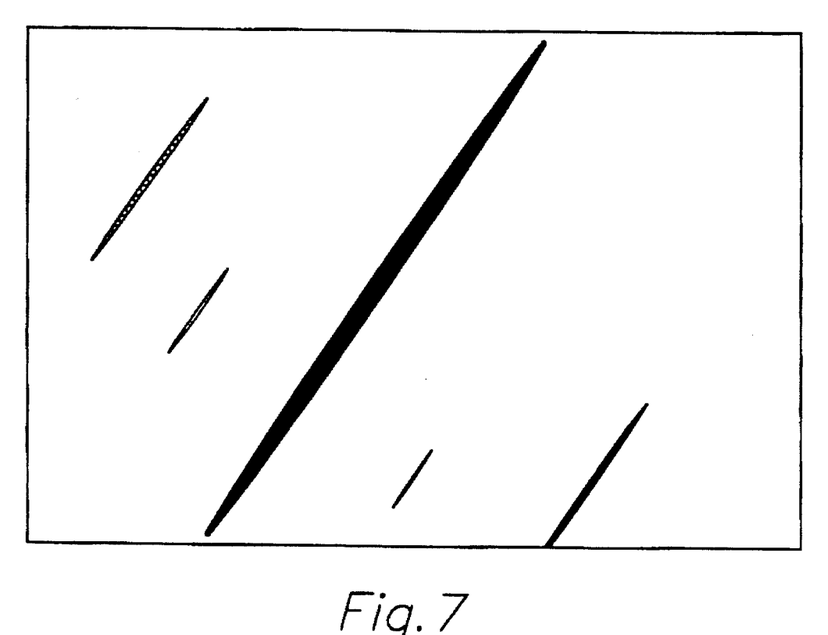
FIG. 7 is a magnified view of a portion of the power spectrum of FIG. 6.
Figure 8:
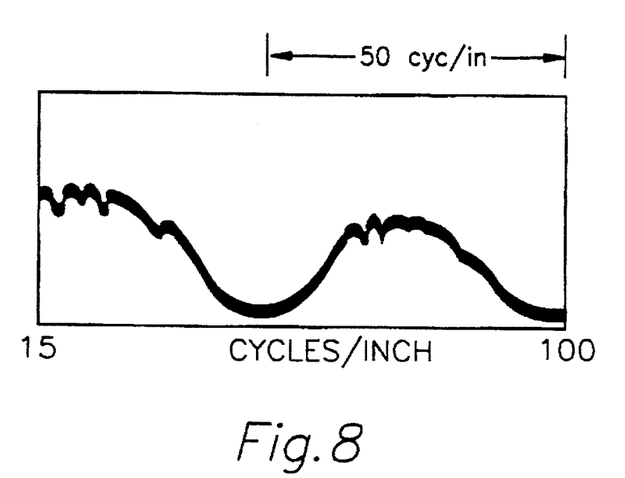
FIG. 8 is a graph showing the profile of a spatial frequency pattern for the image of FIG. 7.

FIG. 5 shows an example of an input image from a matrix display with a binary green line image 0.020 inches wide, drawn at 60° with respect to the display surface on a triad color group with 150 pixels per inch. FIG. 6 shows the input image power spectra taken at the spectral image plane. FIG. 7 is a magnified view of a portion of the input image power spectra, and may be the central term or a replica of that term which does not include the dc component of the Fourier transform. The discontinuities noted at regular intervals on the central image are a consequence of the frame grabber sampling operation, and are not inherent in the display. FIG. 8 is a graphical representation of the intensity profile of an image replica for the input image of FIG. 7. The graph displays approximately one-half of the central lobe of the replica and all of the first lobe. The abscissa scale ranges from 15 to 100 cycles per inch, while the ordinate scale is in relative units.

It will be clear to one skilled in the art that the invention allows one to compare different display systems on an equivalent basis, considering factors that influence the quality of the displayed image such as line writing algorithms, grey scale, sampling structure, sampling density, etc. It is also to be noted that the application of this invention is not limited to a display device, but that all components and subassemblies that influence the intended image will affect the measured values.

Figure 4:
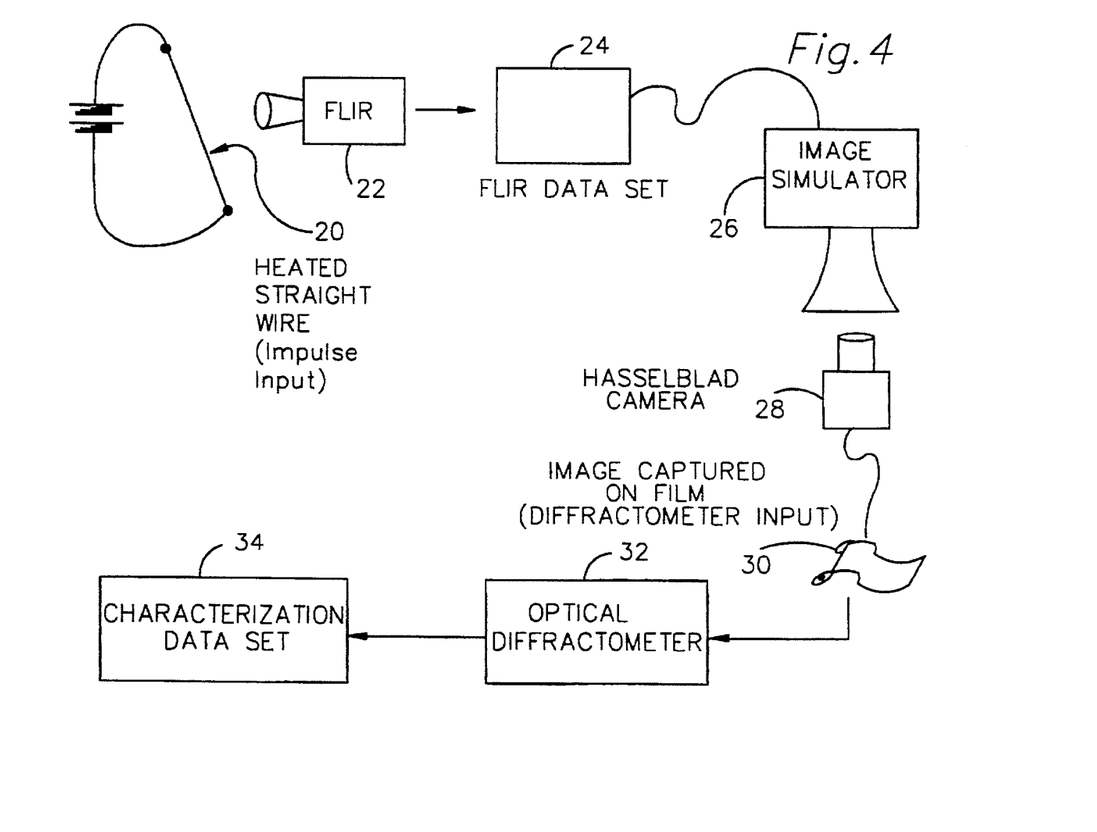
FIG. 4 shows the use of an image simulator in resolution measurement.

For imaging system components other than a display device, it is necessary to convert the output information of the component under test (this information is usually a set of digital data) into a real spatially distributed image. The information that represents the spatially distributed light energy may be converted into light energy and used as an input to the power measuring apparatus of FIG. 3 by devising a calibrated image simulator 26 as shown in FIG. 4. The purpose of the image simulator 26 is to convert the information which represents spatial light distribution into a visual form. The image simulator uses the reconstruction plan just as the imaging device is reconstructed in its intended application. Then, the image which represents the performance of the device, is displayed on the image simulator monitor. Essentially, this is done by photographing the image simulator monitor which is displaying the converted image. Once accurately presented in visual form, a positive film photograph of the output visual information of the image simulator is used as the input image for the measurement system. The image simulator provides a spatial distribution of light energy that accurately represents the reconstructed output of the particular imaging system component under evaluation. Application of the present invention to this synthesized display system facilitates a resolution measurement of any discrete component of an imaging system.

FIG. 4 shows an application for testing a Forward Looking Infrared (FLIR) image source by using an image simulator. A heated wire 20 is placed across the field of view of the FLIR image source 22 at a distance sufficiently far to assure that if the distance were increased, the output data set 24 would not change. Under this condition the wire represents a resolution limiting condition. Because the image of the heated wire is stationary the output data set 24 which represents the field of view is readily recorded. This data set, together with a reconstruction plan are used in a computer program to generate an image file which is displayed on the monitor of the image simulator 26.

Once accurately presented in visual form on an image simulator, a photograph of the image simulator's output visual information is exposed to a camera 28 to provide a positive film photograph, and this film is used as the input into the resolution measurement system.

The information displayed on the monitor is scaled in a manner such that the display characteristics of the monitor are not captured on the positive film photograph. In other words, the information representing the transient response of the imaging system component under test is scaled to be very large with respect to the monitor characteristics, such that the film captures the spatial patterns which result from the imaging system component and not the characteristics of the image simulator monitor.

To generate a line image on an image simulator it is necessary to provide two sets of information relevant to the component under test. The first set of required information is the data set which represents the line image. This is generally in the form of an array of integer values. The second set of required information is a description of the reconstruction method which will be applied to the line image data set.

The reconstruction method defines the technique for assembling the data set into a continuous image, or it defines the technique for assembling another sampled data set with an implied reconstruction method to be applied at another point within the imaging system. In either case it is a definition of the processing which must be performed on the line image data set before an accurate representation of the image can be displayed on the image simulator monitor.

To obtain a measure of resolution it is necessary to photograph a family of line images from the image simulator. In this example the heated wire is rotated and the associated data sets are recorded. Each family member differs in the orientation of the line on the photographed surface. By rotating the line image through many orientations on the display surface it is possible to assimilate a family of one-dimensional "impulse" responses which, when pieced together, form the composite two-dimensional point spread function for the imaging system component being measured. The two-dimensional Fourier transform of the point spread function is the resolution function of the imaging system component which is being measured.

Each line image positive film photograph is placed into the liquid gate 30 and illuminated and optically processed in the optical diffractometer 32, as described heretofor with respect to FIG. 3. The resultant Fourier transform pattern is magnified and focused onto the sensor array of the CCD camera (not shown). The composite video output of the CCD camera is digitized and the data set stored in a characterization data file.

The stored data file contains the baseband resolution information as well as replicated images caused by sampling. The measurement apparatus may be applied to select a region of the stored power spectrum which is representative of the signal energy distribution. This may be the central term or a replica of that term which does not include the DC component. The total luminance intensity along the selected term as a function of displacement (i.e., spatial frequency) is plotted as resolution. The calibration of frequency scale is accomplished by measuring the pitch $\Delta u$ and $\Delta v$ between sampling replicas and interpolating along the axis of the measured term. Adjustments to the data may be made to compensate for replica position with respect to the magnification or resolving power of the measurement apparatus. This measurement is a power measurement which is equivalent to the square of the absolute value of the Fourier transform F(s), where F(s) closely resembles MTF. This measurement produces a parameter that is defined as resolution. Thus, as the resolution increases, the frequency spread of the power terms will increase, and conversely, as the resolution decreases, the frequency spread will decrease.

It may be seen that the present invention provides a generic method for measuring resolution for any component of an imaging system (i.e., display head, display symbol generator, transmission system, and sensor). The apparatus is capable of generating and measuring the two-dimensional spatial frequency power spectrum of its input image. When the input image is the result of an applied impulse to the imaging system component, the spatial frequency power spectrum contains the necessary information to measure resolution for the photographed imaging system component.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself. Therefore, while the invention has been described in its preferred embodiments, it is to be understood that the words which have been used are words of description rather than limitation and that changes may be made within the purview of the appended claims without departing from the true scope and spirit of the invention in its broader aspects.

The embodiments of the invention in which an exclusive property or right is claimed are defined as follows:

1. Apparatus for measurement of resolution of an imaging system comprising:

means responsive to said imaging system for providing a display of a line image at a predetermined angular orientation;

means for providing a photographic facsimile of said line image;

means for providing a light beam in the form of coherent light of a given wavelength, said beam defining an optical axis, and for applying said light beam to said photographic facsimile along said optical axis, thereby to produce a diffraction pattern;

liquid optical gate means positioned along said optical axis for receiving said light beam and said photographic facsimile and for forming said diffraction pattern of said line image first optical means positioned along said optical axis for focusing a Fourier transformation of said diffraction pattern on a spatial frequency plane;

whereat spatial frequency components or said diffraction pattern are dispersed in a spatial light pattern and wherein the amplitude and spectral distribution of the spatial frequency components varies in accordance with a the geometry of said line image;

second optical means focused upon said spatial frequency plane for receiving said spatial light pattern, and for reproducing an image input upon said spatial frequency plane as an output image having magnified features corresponding to the spatial frequency components thereof; and detector means positioned to receive said enlarged image and to store said enlarged image in digital form, where said detector means is responsive to said magnified features for providing a measure of the signal intensities corresponding to said portion of said spatial frequency distribution.

2. Apparatus as set forth in claim 1, wherein said light source means comprises a helium neon (HeNe) laser for providing substantially monochromatic illumination.

3. Apparatus as set forth in claim 2, said first optical means comprising a converging thin lens.

4. Apparatus as set forth in claim 3, said liquid optical gate means comprising a pair of parallel optical flats defining a chamber for receiving a refractive-index matching oil superposed over said photographic facsimile and constrained between said optical flats.

5. Apparatus as set forth in claim 4, said second optical means comprising a macro lens and said means for detecting comprising a video camera and image digitizer for digitizing and storing the resultant image spectral data for analysis.

* * * * *